Patented Mar. 3, 1942

2,275,314

UNITED STATES PATENT OFFICE 2,275,314

GLUE SUITABLE FOR GLUING WOOD VENEERS

Gordon G. Pierson, Lansdale, Pa., assignor to Perkins Glue Company, Lansdale, Pa., a corporation of Delaware No Drawing. Application August 19, 1938, Serial No. 225,813

7 Claims. (Cl. 260—9)

This invention relates to a novel vegetable glue of advantageous properties including increased water-resistance, and to the method of making the same, and more particularly it relates to a product available for use in the gluing of wood veneers and other joined wooden articles.

One object of the present invention is to provide a strongly adherent and coherent vegetable glue adapted, either directly or by means of a porous intermediate layer, to the production of strong and practically permanent joints between wood and wood, or other strong materials, such as are required in the construction of furniture, panels, doors and the like.

Another object is to furnish a glue of the burst starch type, either modified or unmodified, which glue has a wet strength superior to that of the best grades of glues of this type now known and which at the same time possesses a dry strength equal to or greater than that of such glues.

Other objects will be apparent from a consideration of the specification and claims.

The present invention is characterized by associating burst starch dispersed in an aqueous medium with a potential formaldehyde-carbamide condensation product capable of dispersion with said burst starch. The term "potential formaldehyde-carbamide condensation product" as used herein includes not only a water-soluble reaction product of formaldehyde and a carbamide, but also a mixture of formaldehyde and a carbamide which, under conditions encountered after the association of the burst starch therewith, for example at the time the glue bond is set, reacts to form a condensation product. It will, therefore, be apparent that the burst starch may be mixed with a formaldehyde-carbamide condensation product which may at the beginning be present, in part at least, as a monomer and in part as a diamer or higher polymer; or it may be mixed with an unreacted formaldehyde and carbamide, the condensation reaction taking place subsequently either before or during the setting of the bond. The order of the association of the components may be varied as is advantageous in any particular instance. Since the properties of the resulting glue in either of the above cases are superior to those expected from a knowledge of the properties of burst starch glues on the one hand, and of formaldehyde-carbamide condensation products on the other, and since it is known that formaldehyde loosely combines in some manner with burst starch, it is likely that there is a reaction between the burst starch and the potential formaldehyde-carbamide condensation product to form a starch-formaldehyde-carbamide condensation product, and this is, of course, included within the concept of the invention. It is to be understood, however, that this explanation of the possible reason for the advantageous properties of the glue of the present invention is not to be considered as limiting the subject-matter herein set forth and claimed.

As above stated, it is known that formaldehyde loosely combines with burst starch, but, while the resulting product is slightly less soluble, this condition is evanescent so that no advantage has been realized from the use of formaldehyde alone with starch glues. However, when a carbamide converts the formaldehyde into a non-volatile and difficultly dissociated resinous complex, the resulting product containing the burst starch is a strong, water-resistant glue. Such a product is not to be confused with solutions of water-soluble condensation products of formaldehyde and a carbamide, where, in some instances, untreated and unburst starch (as well as other materials) has been included as a filler. In such cases, the starch employed was not selected for its fitness in gluing work, but was merely used as an inert thickener. Such glues have frequently been found to require too long a time in completing their "set," or to result in granular or "starved joints." Furthermore, since the form-aldehyde-carbamide condensation product is many times as expensive as the best and most suitable grade of starch, the cost of high proportions of the condensation product required is prohibitive, particularly since the starch used was not so selected and prepared as to lend its quota of strength to the mixture.

The term "burst starch" is employed herein to include a starch whose granules have been burst sufficiently to possess adhesive and penetrating properties. Substantially completely burst starch is preferably employed, since in this case the starch possesses the maximum adhesive and penerating properties. The starch subjected to bursting is preferably cassava starch, although potato and sago starch may be used. The bursting process may be conducted in accordance with the well-known processes for the production of such products, for example, by water plus alkali, or water plus heat plus alkali, examples of alkalies commonly used being caustic soda, soda ash and ammonia. The treated starch is cooled, and is neutralized, if more than a slight amount of alkali has been used, before associating it with the potential formaldehyde-carbamide condensation product.

In many instances, it is preferable to employ a burst starch whose viscosity and water requirements, as well as coherence, penetration, degree of solubility, fineness of dispersion and the like, have been altered or modified. Most of the agents with which starch is treated in making glue, such as hydrogen peroxide, sodium peroxide, sulphuric acid, nitric acid and the like, have a complex action which is commonly called hydrolyzation, but which, in some cases at any rate, includes decomposition of the oxide and presumably oxidation of the starch substance. The term "burst starch chemically modified by hydrolyzation," as used herein and in the claims, therefore, includes those starches whose physical properties have been altered by means of chemicals, as above described, with or without heat, as is well known in the art. This alteration or modification of the starch may take place prior to, during, or subsequent to the bursting thereof. Preferably, the modification step is conducted during or shortly after bursting.

The starch products, preferable for use, are of the general character of those described in United States Letters Patents Nos. 2,006,164 and 1,989,150, provided that the burst starch there described is neutralized so that at the most it is only slightly alkaline. Other materials, such as oils, and fillers, may be used in preparing, preserving, or conditioning the starch to be used, or the vegetable glue product, and according to circumstances, these treatments, as well as the bursting, or the altering or modifying steps may not only be carried out prior to the association of the starch substance with the potential formaldehyde-carbamide condensation product, but also at the time of the said association, or, under some circumstances, even after the starch and the potential formaldehyde-carbamide condensation product have been mixed together.

As previously stated, the potential formaldehyde-carbamide condensation product may be a water-soluble reaction product of formaldehyde and a carbamide, or it may be a mixture of formaldehyde and a carbamide which, under conditions encountered after the association of the burst starch therewith, reacts to form a condensation product. The aldehyde employed may be formaldehyde, or polymer thereof, available for condensation with a carbamide, paraformaldehyde and the like being examples. Hexamethylenetetramine may be employed in minor quantities to replace a portion of the formaldehyde, or polymer thereof. All such compounds are included herein within the term "formaldehyde." The carbamide may be either urea or thiourea. A portion of the total carbamide employed in the final glue may be added to the vegetable glue base in the event a pre-formed condensation product is to be associated with the glue base. The addition of the carbamide to the glue base in such case serves to reduce the water ratio of the glue and to delay the evaporation or absorption of water from the glue as it is later spread out in a thin film on wood or other absorptive material.

The water-soluble formaldehyde-carbamide condensation products are exemplified by methylol and dimethylol urea and by the amorphous resinous products whose polymerization has not been carried beyond the water-soluble stage. The term "water-soluble condensation product" includes those products where the condensation is stopped at any point over a rather broad range previous to the stage where the condensation product ceases to be dispersible in the burst starch dispersion. The ratio of formaldehyde to carbamide may also be varied considerably without essentially reducing the value of the condensation product for glue-making purposes.

The condensation of the formaldehyde and carbamide either prior to or after its association with the burst starch may be carried out under slightly acid or slightly alkaline conditions, or under a combination of acid and alkaline conditions. Acids, such as hydrochloric or acetic, and acid-forming salts, such as zinc chloride or ammonium chloride, may be used. Usually slightly acid conditions are preferred since, as is known, the starch glues commonly used, due to their alkalinity, stain many woods. Attempts to neutralize these prior glues, or to make them slightly acid, have resulted in a decrease in strength. In accordance with the present invention, the burst starch even if originally treated with alkali can be used in the production of a neutral or acid product, due to its association with the condensation product containing an acid catalyst. Such a glue, is, therefore, non-staining and possesses a strength exceeding that developed by the previously prepared "non-staining starch glues."

The polymerization of the formaldehyde-carbamide condensation may be governed by controlling the acidity and temperature of the mixture, and the acidity may in turn be controlled by the addition of a buffer to the mixture. The use of a zinc salt furnishing hydrochloric acid to the glue product, such as zinc chloride, or a mixture of zinc carbonate and ammonium chloride, as a catalyst or accelerator, results in a very smooth and controlled polymerization, since very little acid is freed and the reaction proceeds very slowly until heat is applied. When the mixture is heated, a large portion of acid is set free to act as an accelerator and hasten the set or coagulation of the glue. A small proportion of acid may be used if desired with the zinc salt. The final product is about the same whether an acid, an ammonium salt, or a zinc salt is used as an accelerator, but when a zinc salt of the type described is used alone, or in conjunction with a small amount of acid, a longer liquid or working life of the glue is obtained.

If desired, the use of an acid, or acid-producing accelerator, may be omitted, since the burst starch and the potential formaldehyde-carbamide condensation product are rapidly cured and set by their own reaction when heat is applied. Without the addition of an acid accelerator, a very long life is secured before the application of heat. The life may extend over several days, but when heat is applied, a rapid glue set is obtained, due to an acid condition resulting from the reaction. The set and curing of the product of the invention is slightly slower without an acid accelerator.

The ratio of burst starch to the potential formaldehyde-carbamide condensation product (dry basis) may vary widely, depending upon the properties desired in the particular glue product. In general, the lower limit of burst starch on the basis of total burst starch plus potential formaldehyde-carbamide condensation product (dry basis) is about 15%. Usually a lower-limit of 25% is better, and the optimum range is for most purposes between 30% and 70%, and more particularly from 40% to 60%. The upper limit may be appreciably higher, and may be about 85%, it being understood that as the amount of burst starch is increased above the optimum range, the amount of water resistance imparted to the resin by the condensation product decreases.

In associating the burst starch dispersed in an aqueous medium with the potential formaldehyde-carbamide condensation product, care is taken to obtain a thorough mixing of the various components, since it will be apparent that without thorough inter-dispersion of the components, the desired waterproofing and binding, both initial and final, is difficult to obtain. The relative amount of water associated with the potential condensation product and with the burst starch is immaterial provided that the total amount of water in the glue product is limited. In general, in order to produce a satisfactory glue in accordance with the present invention, the amount of water will not exceed about three parts of water to one part of solids in the glue. The lower limit is about one part of water to one part of solids, and in general, the preferred range will be in the neighborhood of 1.5 to 2 parts of water to 1 part of solids.

The application of the glues of the present invention to the materials to be united may also vary, as will appear from the examples hereinafter set forth. Briefly, the glues produce reasonably good results when applied to wood surfaces and pressed cold in the same manner as ordinary vegetable glues, but produce extremely strong joints and high water-resistance when hot-pressed directly, or when cold-pressed and then given a heat-treatment, such as curing in warm or hot air, or hot-pressing between cauls. As previously indicated, it is possible by suitable selection, or pretreatment of the starch material, or both, to vary the viscosity and water requirements of the glue mixture and adjust them to suit the requirements of various kinds of glued-up materials in the various ways already known to the art of making starch adhesives for gluing wood and for similar purposes.

In the glues of the present invention containing a substantial proportion of burst starch molecules and potential resin aggregates, the waterproofing of the latter and the cohesive action of the former is different both in kind and degree from any action obtainable with the usual inert fillers including unburst starch used in the ordinary manner to thicken resin adhesives. The presence of the relatively large quantity of burst starch dispersed in an aqueous medium tends to retard the autogenous setting of the resin in various ways, for example, by acting as a sort of adsorption-buffer to control, within limits, the effective acidity of the aqueous dispersion of the resinous substance, and, hence, regulate the rate of setting thereof more reliably within the limits established by the composition of the resin solution and of the burst starch present.

The burst starch is per se an inherently strong glue and requires only the water-repellent coaction of relatively small amounts of the formaldehyde-carbamide condensation product to become not only highly water-resistant, but substantially stronger than starch glues themselves. Thus, the resin content need not be high, and marked waterproofing, as well as increased strength, is secured at low cost, since the starch contributes largely to the strength and impregnation, while the expensive resin is quite effective in relatively small amounts for waterproofing. The cooperative action of the two components apparently goes even further, as has been previously indicated, since the resinous condensation products appear to aid in the dispersion of the starch glue and to assist in maintaining its smooth uniform dispersion, once formed, increasing its spread and initial "set" if desired. Nevertheless, it is controllable and adjustable. The glues produced by such a combination are superior to glues heretofore produced by either component alone.

The glues of the present invention are to be contrasted with the weak and insecure adhesives, such as are suitable for mucilage, sizes, and pastes, requiring only impregnation and filling of the pores with weak and insecure material, since they are characterized by strongly adherent and coherent properties adapted to the production of strong and practically permanent joints between wood and wood, or other strong materials, such as are required in the construction of furniture, panels, doors and the like.

The following examples will serve to illustrate the principles of making and applying the novel waterproof starch glue of the invention, from which an understanding of the procedure will enable others to adapt the methods to the particular type of product desired.

EXAMPLE 1

In this example, the burst starch is mixed with the potential formaldehyde-carbamide condensation product in the form of a mixture of formaldehyde and urea capable of reacting subsequently during the formation of the glue bond to form the condensation product.

To a suitable mixing kettle containing about 165 parts of water, 99 parts of a good average grade of cassava flour and 1 part of barium peroxide are added, followed by the addition of 3 parts of caustic soda dissolved in 10 parts of water. The mixture is agitated and heated to a temperature of 160° F., after which it is cooled with agitation, resulting in a completely burst and modified starch glue. This glue is then neutralized with hydrochloric acid and mixed with 55 parts of 37% formaldehyde, 27 parts of urea, and about 1 part of hydrochloric acid. To prepare a laminated product, such as plywood, the glue is spread in the same manner employed for vegetable glue, and to complete the bond, one of the following methods may be employed:

(1) The laminations are placed under pressure at room temperature up to about 24 hours, after which they are removed and allowed to season for a period. The bond will be moderately strong and moisture-resistant.

(2) The same procedure of (1) is followed, but upon releasing the pressure from the laminated product, it is given a heat treatment, which may be hot-pressing for several minutes at a pressure of about 100 pounds per square inch and a temperature of 230° F., or the product may be baked at the same temperature without any pressure. The joints so prepared are as strong as those from the average vegetable glues and withstand immersion in water from five to twenty times as long as vegetable glues.

(3) The laminations may be placed in a hot press shortly after the glue has been spread without any previous cold-pressing and the bond set by the application of heat and pressure requiring about 230° F. for a period of several minutes, depending on the thickness of the layers of the product. The joints properly prepared by this method are frequently much stronger than those from the average vegetable glue used in wood-working and withstand immersion in water from five to twenty times as long.

EXAMPLE 2

(a) *The formaldehyde-carbamide condensation product*

Dissolve 100 parts of urea in about 210 parts of neutralized 40% commercial formalin and heat at 200° F. for 1 to 2 hours, or until considerable condensation has occurred, whereupon this primary condensation product is cooled and is available for subsequent use.

(b) *The vegetable glue*

Add 300 parts of water to a jacketed agitation kettle, and then add with agitation 100 parts of a selected tapioca flour sold under the tradename "Banthong KK" or other medium grade cassava flour. Add .1 part of soda ash and heat with agitation to a temperature of 185° F., or until the flour is burst and a free-flowing and a well digested glue is produced, after which the glue is cooled with agitation to room temperature. The alkalinity of the glue is then neutralized with hydrochloric acid.

(c) *The final glue*

Mix 150 parts of (a) with 400 parts of (b) and add .5 part of ammonium chloride.

(d) *The application of the final glue*

Birch veneer 1/16" thick is coated with the glue of (c) and assembled in the conventional manner with two other plies of 1/16" birch veneer to make a 3-ply panel and the product tested in sheer by the standard method. A dry strength of 300 pounds to 600 pounds per square inch and a wet strength after 48 hours soaking in water of from 200 pounds to 300 pounds per square inch are obtained. In other words, plywood made with this glue gives a dry strength equal to, and usually stronger than, the usual starch glue, and after 48 hours of water-soaking, the wet strength is equal to, and usually greater than waterproof casein glues.

EXAMPLE 3

(a) *The formaldehyde-carbamide condensation product*

In this example, the condensation product is made in the same manner as (a) in Example 2, except that thiourea is used in place of the urea of that example.

(b) *The vegetable glue*

Add 300 parts of water to a jacketed agitation kettle and then add with agitation 100 parts of an average grade of cassava flour. Add .1 part of 100 volume hydrogen peroxide and 1 part of ammonia. Heat with agitation until a temperature of about 180° F. is reached, and then cool the glue while agitating.

(c) *The final glue*

Mix 140 parts of (a) with 400 parts of (b) and add 5 parts of zinc chloride.

(d) *The application of the final glue*

When veneers are spread with this glue and hot-pressed in the conventional manner, strong and water-resistant panels are produced.

EXAMPLE 4

(a) *The formaldehyde-carbamide condensation product*

This is the same as described in Example 2.

(b) *The vegetable glue*

First make a dry mix of 97 parts of an average grade of cassava flour with 1.5 parts of zinc carbonate and 1.5 parts of ammonium chloride. This dry base is mixed with 250 parts of water, after which 1 part of ammonia and .1 part of 100 volume hydrogen peroxide is added. Heat with agitation until the starch is completely burst and converted into a free-flowing glue; then cool to room temperature with agitation.

(c) *The final glue*

Mix 70 parts of (a) with 350 parts of (b), whereupon the glue is ready to use.

(d) *The application of the final glue*

The glue may be spread upon the wood veneers and pressed at room temperature until set, after which the panels may be given a heat-treatment if a stronger and more water-resistant bond is required, or the glue may be spread on veneers and hot-pressed into panels while the glue is wet or damp and without any previous pressure at room tempertaure. When properly prepared, such panels will have a tremendous strength and extremely high waterproof properties in cold water. Standard sheer tests made on 1/16" birch veneer 3-ply will run as high as 500 pounds per square inch dry and stand soaking in cold water for many days. In other words, the strength of such a panel will usually exceed that of the conventional vegetable glue, and the water-resistance will equal or exceed the average casein waterproof glue. Furthermore, due to the use of zinc carbonate and ammonium chloride as hereinbefore described, the liquid working life of such a glue is exceedingly long, running up to 48 hours at average room temperature.

EXAMPLE 5

(a) *The formaldehyde-carbamide condensation product*

The condensation product in the example is dimethylol urea in the crystal form, and may be made by any of the recognized methods used for that purpose.

(b) *The vegetable glue*

This is the product made by Example 4(b), although that of any of the other examples may be used.

(c) *The final glue*

Mix 100 parts of (a) with 350 parts of (b).

(d) *The application of the final glue*

When the glue is spread on wood and coldpressed, it will produce a fair joint, which is greatly improved by some heat-treatment, or if the glue is hot-pressed directly by the conventional methods, it will produce joints of great strength and water-proofness. When panels are prepared, using this glue, in the usual hot press process, the dry strength resulting will usually exceed that of the conventional vegetable glue, and the wet strength will usually considerably exceed that of the conventional water-proof casein glues.

EXAMPLE 6

(a) The formaldehyde-carbamide condensation product

Dissolve 100 parts urea in 250 parts of hot 37% commercial formalin which has been made slightly acid with acetic acid, adding the urea in small portions, and continue to heat for about 30 minutes or until considerable condensation has occurred, after which this primary condensation product is neutralized with calcium carbonate and cooled. This product can also be used in all previous examples in place of the condensation products described.

(b) The vegetable glue

First make a dry glue base mix of 97 parts of an average grade of cassava flour with 1 part of zinc carbonate and 2 parts of ammonium chloride. This dry base is mixed with 2.25 parts of water, after which 1 part of ammonia and .15 part of 100 volume hydrogen peroxide is added. Heat with agitation until the starch is burst and converted into a free-flowing glue; then cool to room temperature with agitation then add 15 parts of urea. This urea serves to reduce the water ratio of the glue and to delay the evaporation or absorption of water from the glue as it is later spread out in a thin film on wood or other absorptive materials.

(c) The final glue

Mix 150 parts of (a) with 345 parts of (b), whereupon the glue is ready to use.

(d) The application of the final glue

The glue may be applied as set forth in the preceding examples.

Considerable modification is possible in the particular burst starch and potential condensation product employed, as well as in the proportions of the two components and in the methods of preparing the glue, without departing from the essential features of the invention.

I claim:

1. A glue suitable for gluing wood veneers having an acid reaction at least during the development period of the glue bond comprising burst starch selected from the group consisting of cassava, potato, and sago starch, said burst starch furnishing adhesive properties to the glue and being at the most only slightly alkaline, and a potential formaldehyde-carbamide condensation product, said ingredients being dispersed in an aqueous medium, the amount of burst starch present being between about 15% and 85% of the total weight of burst starch and potential condensation product (dry basis) and the amount of water present being between about 3 parts of water to 1 part of solids and about 1 part of water to 1 part of solids in the glue.

2. A glue suitable for gluing wood veneers having an acid reaction at least during the development period of the glue bond comprising burst starch selected from the group consisting of cassava, potato, and sago starch, said burst starch furnishing adhesive properties to the glue and being at the most only slightly alkaline, formaldehyde and a carbamide, said ingredients being dispersed in an aqueous medium, the conditions being such that components of said dispersion are reactable to form a condensation product, the amount of burst starch present being between about 15% and 85% of the total weight of burst starch and potential condensation product (dry basis) and the amount of water present being between about 3 parts of water to 1 part of solids and about 1 part of water to 1 part of solids in the glue.

3. The product of claim 2 wherein the burst starch is burst starch chemically modified by hydrolyzation.

4. The product of claim 2 wherein the burst starch is cassava starch and is present in amounts between 30% and 70% of the total weight of burst starch and potential condensation product (dry basis).

5. A glue suitable for gluing wood veneers having an acid reaction at least during the development period of the glue bond comprising burst starch selected from the group consisting of cassava, potato, and sago starch, said burst starch furnishing adhesive properties to the glue and being at the most only slightly alkaline and a formaldehyde-carbamide condensation product, said ingredients being dispersed in an aqueous medium, the amount of burst starch present being between about 15% and 85% of the total weight of burst starch and condensation product (dry basis) and the amount of water present being between about 3 parts of water to 1 part of solids and about 1 part of water to 1 part of solids in the glue.

6. The product of claim 5 wherein the burst starch is burst starch chemically modified by hydrolyzation.

7. The product of claim 5 wherein the burst starch is cassava starch and is present in amounts between 30% and 70% of the total weight of burst starch and condensation product (dry basis).

GORDON G. PIERSON.